United States Patent
Hill et al.

(10) Patent No.: US 10,631,131 B2
(45) Date of Patent: Apr. 21, 2020

(54) VIRTUAL REALITY AND AUGMENTED REALITY FUNCTIONALITY FOR MOBILE DEVICES

(71) Applicant: Position Imaging, Inc., Portsmouth, NH (US)

(72) Inventors: Edward L. Hill, Exeter, NH (US); Krenar Komoni, Worcester, MA (US); Rafal Piotrowski, Portsmouth, NH (US); Yifeng Xiong, Somersworth, NH (US)

(73) Assignee: POSITION IMAGING, INC., Portsmouth, NH (US)

( * ) Notice: Subject to any disclaimer, the term of this patent is extended or adjusted under 35 U.S.C. 154(b) by 0 days.

(21) Appl. No.: 16/264,729

(22) Filed: Feb. 1, 2019

(65) Prior Publication Data

US 2019/0166463 A1 May 30, 2019

Related U.S. Application Data

(63) Continuation of application No. 14/614,734, filed on Feb. 5, 2015, now Pat. No. 10,200,819.
(Continued)

(51) Int. Cl.
H04W 4/02 (2018.01)
(52) U.S. Cl.
CPC .................... H04W 4/026 (2013.01)
(58) Field of Classification Search
CPC .............................. H04W 4/026; H04W 64/00
See application file for complete search history.

(56) References Cited

U.S. PATENT DOCUMENTS

| 2,408,122 A | 9/1946 | Wirkler |
| 3,824,596 A | 7/1974 | Guion et al. |

(Continued)

FOREIGN PATENT DOCUMENTS

| WO | 2001006401 A1 | 1/2001 |
| WO | 2005010550 A1 | 2/2005 |

OTHER PUBLICATIONS

Wilde, Andreas, "Extended Tracking Range Delay-Locked Loop," Proceedings IEEE International Conference on Communications, Jun. 1995, pp. 1051-1054.
(Continued)

*Primary Examiner* — Tuan H Nguyen
(74) *Attorney, Agent, or Firm* — Schmeiser, Olsen & Watts LLP

(57) ABSTRACT

Systems and methods improve virtual reality and augmented reality functionality for mobile devices using radio frequency (RF) signals transmitted by a tracked device and received at four or more spatially separated antennae. These antennae are connected, wirelessly or through wired connections, to a base station. Through RF signal time of arrival information acquired at the antennae, the base station can continuously determine accurate position information of the tracked device, without lighting or line of sight limitations experienced by camera and other optical systems. As the position of the RF-transmitting tracked device is registered within a virtual environment produced by an interactive software program in communication with (or part of) the base station, the virtual viewpoint of the tracked device is controlled to reflect the relative position and orientation of the tracked device with respect to the virtual environment produced by the software program and displayed on a view screen.

16 Claims, 3 Drawing Sheets

Related U.S. Application Data

(60) Provisional application No. 61/936,411, filed on Feb. 6, 2014.

(56) References Cited

U.S. PATENT DOCUMENTS

| | | |
|---|---|---|
| 3,940,700 A | 2/1976 | Fischer |
| 4,328,499 A | 5/1982 | Anderson et al. |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison, Jr. et al. |
| 6,750,816 B1 | 6/2004 | Kunysz |
| 6,861,982 B2 | 3/2005 | Forstrom et al. |
| 6,867,774 B1 * | 3/2005 | Halmshaw ............ G06T 15/08 345/424 |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | Macleod |
| 7,646,330 B2 | 1/2010 | Karr |
| 7,868,760 B2 | 1/2011 | Smith et al. |
| 7,876,268 B2 | 1/2011 | Jacobs |
| 7,933,730 B2 | 4/2011 | Li et al. |
| 8,269,624 B2 | 9/2012 | Chen et al. |
| 8,457,655 B2 | 6/2013 | Zhang et al. |
| 8,749,433 B2 | 6/2014 | Hill |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander et al. |
| 9,141,194 B1 | 9/2015 | Keyes et al. |
| 9,174,746 B1 | 11/2015 | Bell et al. |
| 9,482,741 B1 | 11/2016 | Min et al. |
| 9,497,728 B2 | 11/2016 | Hill |
| 9,519,344 B1 | 12/2016 | Hill |
| 9,782,669 B1 | 10/2017 | Hill |
| 9,872,151 B1 | 1/2018 | Puzanov et al. |
| 9,933,509 B2 | 4/2018 | Hill et al. |
| 9,961,503 B2 | 5/2018 | Hill |
| 10,001,833 B2 | 6/2018 | Hill |
| 10,180,490 B1 | 1/2019 | Schneider et al. |
| 2002/0021277 A1 | 2/2002 | Kramer et al. |
| 2002/0140745 A1 | 10/2002 | Ellenby et al. |
| 2002/0177476 A1 | 11/2002 | Chou |
| 2003/0053492 A1 | 3/2003 | Matsunaga |
| 2003/0120425 A1 | 6/2003 | Stanley et al. |
| 2003/0176196 A1 | 9/2003 | Hall et al. |
| 2003/0195017 A1 | 10/2003 | Chen et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2005/0001712 A1 | 1/2005 | Yarbrough |
| 2005/0057647 A1 | 3/2005 | Nowak |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2008/0007398 A1 | 1/2008 | DeRose et al. |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0174485 A1 | 7/2008 | Carani et al. |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0149202 A1 | 6/2009 | Hill et al. |
| 2009/0243932 A1 | 10/2009 | Moshfeghi |
| 2009/0323586 A1 | 12/2009 | Hohl et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1 | 6/2010 | Naguib et al. |
| 2011/0006774 A1 | 1/2011 | Baiden |
| 2011/0037573 A1 | 2/2011 | Choi |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2012/0013509 A1 | 1/2012 | Wisherd et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0286933 A1 | 11/2012 | Hsiao |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0029685 A1 | 1/2013 | Moshfeghi |
| 2013/0036043 A1 | 2/2013 | Faith |
| 2013/0113993 A1 * | 5/2013 | Dagit, III ............... G06F 3/017 348/552 |
| 2013/0281084 A1 | 10/2013 | Batada et al. |
| 2013/0314210 A1 | 11/2013 | Schoner et al. |
| 2014/0022058 A1 | 1/2014 | Striemer et al. |
| 2014/0253368 A1 | 9/2014 | Holder |
| 2014/0300516 A1 | 10/2014 | Min et al. |
| 2014/0361078 A1 | 12/2014 | Davidson |
| 2015/0009949 A1 | 1/2015 | Khoryaev et al. |
| 2015/0039458 A1 | 2/2015 | Reid |
| 2015/0091757 A1 | 4/2015 | Shaw et al. |

(56) References Cited

U.S. PATENT DOCUMENTS

| | | |
|---|---|---|
| 2015/0130664 A1 | 5/2015 | Hill et al. |
| 2015/0134418 A1 | 5/2015 | Leow et al. |
| 2015/0169916 A1 | 6/2015 | Hill et al. |
| 2015/0221135 A1 | 8/2015 | Hill et al. |
| 2015/0323643 A1 | 11/2015 | Hill et al. |
| 2015/0362581 A1 | 12/2015 | Friedman et al. |
| 2015/0379366 A1 | 12/2015 | Nomura et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0238692 A1 | 8/2016 | Hill et al. |
| 2016/0256100 A1 | 9/2016 | Jacofsky et al. |
| 2016/0286508 A1 | 9/2016 | Khoryaev et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill et al. |
| 2017/0031432 A1 | 2/2017 | Hill |
| 2017/0123426 A1 | 5/2017 | Hill et al. |
| 2017/0234979 A1 | 8/2017 | Mathews et al. |
| 2017/0261592 A1 | 9/2017 | Min et al. |
| 2017/0280281 A1 | 9/2017 | Pandey et al. |
| 2017/0323174 A1 | 11/2017 | Joshi et al. |
| 2017/0323376 A1 | 11/2017 | Glaser et al. |
| 2017/0350961 A1 | 12/2017 | Hill et al. |
| 2017/0372524 A1 | 12/2017 | Hill |
| 2018/0068266 A1 | 3/2018 | Kirmani et al. |
| 2018/0164103 A1 | 6/2018 | Hill |
| 2018/0197139 A1 | 7/2018 | Hill |
| 2018/0231649 A1 | 8/2018 | Min et al. |
| 2018/0242111 A1 | 8/2018 | Hill |
| 2019/0090744 A1 | 3/2019 | Mahfouz |

OTHER PUBLICATIONS

"ADXL202/ADXL210 Product Sheet", Analog Devices, Inc., Analog. com, 1999.

Alban, Santago "Design and Performance of a Robust GPS/INS Attitude System for Automobile Applications", Dissertation, Stanford University, Jun. 2004; 218 pages.

Farrell and Barth, "The Global Positioning System & Interial Navigation", 1999, McGraw-Hill; pp. 245-252.

Farrell, et al. "Real-Time Differential Carrier Phase GPS-Aided INS", Jul. 2000, IEEE Transactions on Control Systems Technology, vol. 8, No. 4; 13 pages.

Filho, et al. "Integrated GPS/INS Navigation System Based on a Gyroscope-Free IMU", DINCON Brazilian Conference on Synamics, Control, and Their Applications, May 22-26, 2006; 6 pages.

Gao, Jianchen "Development of a Precise GPS/INS/On-Board Vehicle Sensors Integrated Vehicular Positioning System", Jun. 2007, UCGE Reports No. 20555; 245 pages.

Gautier, Jennifer Denise "GPS/INS Generalized Evaluation Tool (GIGET) for the Design and Testing of Integrated Navigation Systems", Dissertation, Stanford University, Jun. 2003; 160 pages.

Goodall, Christopher L. , "Improving Usability of Low-Cost INS/ GPS Navigation Systems using Intelligent Techniques", Jan. 2009, UCGE Reports No. 20276; 234 pages.

Grewal and Andrews "Global Positioning Systems, Inertial Navigation, and Integration" Section 8.6-8.6.3.1, 2001, John Weiley and Sons, pp. 252-256.

Li, Xin, et al. "Multifrequency-Based Range Estimation of RFID Tags," 2009, IEEE.

Pourhomayoun, Mohammad and Mark Fowler "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

Proakis, John G. and Masoud Salehi, "Communication Systems Engineering", Second Edition, Prentice-Hall, Inc., Upper Saddle River, New Jersey, 2002; 815 pages.

Schmidt and Phillips, "INS/GPS Integration Architectures", NATO RTO Lecture Seriers, First Presented Oct. 20-21, 2003; 24 pages.

Schumacher, Adrian "Integration of a GPS aided Strapdown Inertial Navigation System for Land Vehicles", Master of Science Thesis, KTH Electrical Engineering, 2006; 67 pages.

Sun, Debo "Ultra-Tight GPS/Reduced IMU for Land Vehicle Navigation", Mar. 2010, UCGE Reports No. 20305; 254 pages.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

Vikas Numar N. "Integration of Inertial Navigation System and Global Positioning System Using Kalman Filtering", M.Tech Dissertation, Indian Institute of Technology, Bombay, Mumbai, Jul. 2004; 69 pages.

Welch, Greg and Gary Bishop "An Introduction to the Kalman Filter, TR95-041," Department of Computer Science, University of North Carolina at Chapel Hill, Chapel Hill, NC 27599-3175, Updated: Monday, Jul. 24, 2006.

Yang, Yong "Tightly Coupled MEMS INS/GPS Integration with INS Aided Receiver Tracking Loops", Jun. 2008, UCGE Reports No. 20270; 205 pages.

Notice of Allowance in U.S. Appl. No. 14/614,734 dated May 30, 2018; 5 pages.

Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).

Hill, et al. "Package Tracking Systems and Methods," U.S. Appl. No. 15/091,180, filed Apr. 5, 2016.

Hill, et al. "Video for Real-Time Confirmation in Package Tracking Systems," U.S. Appl. No. 15/416,366, filed Jan. 26, 2017.

Piotrowski, et al. "Light-Based Guidance for Package Tracking Systems," U.S. Appl. No. 15/416,379, filed Jan. 26, 2017.

Restriction Requirement in U.S. Appl. No. 14/614,734 dated Oct. 7, 2016; 6 pages.

Non-Final Office Action in U.S. Appl. No. 14/614,734 dated Dec. 7, 2016; 15 pages.

Final Office Action in U.S. Appl. No. 14/614,734 dated Apr. 11, 2017; 19 pages.

Morbella N50: 5-inch GPS Navigator User's Manual, Maka Technologies Group, May 2012 (Year 2012).

\* cited by examiner

VIRTUAL REALITY AND AUGMENTED REALITY FUNCTIONALITY FOR MOBILE DEVICES

RELATED APPLICATION

This application is a continuation of U.S. patent application Ser. No. 14/614,734 filed on Feb. 5, 2015 and titled "Virtual Reality and Augmented Reality Functionality for Mobile Devices," which claims the benefit of and priority to U.S. provisional patent application No. 61/936,411, filed Feb. 6, 2014, titled "Virtual Reality and Augmented Reality Functionality for Mobile Devices," the entirety of which provisional application is incorporated by reference herein.

FIELD OF THE INVENTION

The invention relates generally to systems and methods for improving virtual reality (VR) and augmented reality (AR) interaction when using mobile devices. More particularly, the invention relates to a system that utilizes radio frequency (RF) tracking and inertial sensing to track the physical position and orientation of an RF signal-transmitting tracked device (i.e., mobile device physically coupled to a RF signal-transmitting device") to register the virtual view position of the tracked device from its camera (i.e., viewpoint) and spatially register the viewpoint with digital images displayed on screens or monitors of the tracked device or other medium.

BACKGROUND

Since the early days of computers, efforts have been made to improve intuitive and realistic interaction between humans and computers. From mouse to touchscreen interface technologies, making a user's experience with their computer more lifelike and intuitive has been a key for increasing productivity and advancing how people can use and interact with their digital worlds. Virtual Reality (VR) is an artificial digital world that consists of images and sounds created by a computer, viewed and heard by a user, and at times affected by the actions of the user who is experiencing it. Augmented Reality (AR) is an augmented version of reality created by the use of technology to overlay digital information of an image on or in something being viewed through a device (such as a smartphone camera). Although all forms of human-computer interaction could be considered one form of VR, AR, or both, the VR/AR world has carried a reputation over the years as either being futuristic or just part of a small specialty or hobby industry.

When viewing digital images on a mobile view screen, like a Head Mounted Display (HMD), the effect of immersing a user in a virtual reality world with part of the digital world viewed that is not related in some way with the "real" world of the user can limit the experience, frustrate the user, or in some cases cause sickness. For example, an HMD with head tracking attempts to register a user's view and physical position within the digital world being seen by the user wearing the HMD, but delays in screen display responsiveness to position and orientation, as it relates the user's physical position or movement, produces an unsettled, uncomfortable sensation, similar to vertigo where the viewed world is out of sync with the viewer. Thus, enabling tablets and smartphones to be fully capable of VR/AR that accurately places the person's viewpoint in the computer generated environment in relation to its position in real world, helps to eliminate sicknesses that are related to VR/AR HMD applications, since tablets and smartphones do not entirely cover the field of vision of the user with the computer graphic (CG) image.

In addition to the physiological effects from the image display lag experienced in VR and AR applications that use HMD, or in VR glasses with position-registered head tracking, the cost of typical head tracking systems are extremely expensive. Typically, a VR system that uses an HMD to provide spatial registration of a user's viewpoint for a more immersive, realistic experience utilizes an optical tracking solution to track the user's HMD position and register that position with a virtual view displayed on the HMD monitor screen. The optical tracking approach is limited as it usually requires a special light or reflective marker placed on a part of the tracked HMD. This optical approach has several technical limitations such as small working volumes, line of sight dependence, limited freedom of movement, and awkward ergonomics as a result of the requirement for markers on the tracked device (HMD). Also, some of these optical tracking approaches require high speed cameras that are not only expensive, but also suffer from the same technical limitations and require relatively high numbers of cameras to cover the working area.

SUMMARY

All examples and features mentioned below can be combined in any technically feasible way.

Tracking systems and methods described herein use a radio frequency (RF) tracking methodology that wirelessly tracks mobile devices, such as smartphones, tablets, AR or VR glasses, HMDs, and any other device capable of transmitting RF signals, referred to generally as a tracked device. By utilizing RF signals, as opposed to light, all of the limitations listed above can be resolved, and the cost of the tracking system drastically reduced. Not only do these benefits provide a more realistic immersive experience to the user than light-based system, but they also enable new applications previously impossible because of the high cost, lighting restrictions, response time lag, and other issues of the optical systems.

In one aspect, an RF-based position tracking system (hereafter, tracking system) provides immersive interaction between users with tracked devices (mobile devices physically coupled to an RF-signal transmitting device) and interactive software programs. The tracking system comprises a network of four or more spatially separated antennae fixed at different locations around the working volume or area of the application space, a base station that receives and processes the signals from the antennae, and one or more tracked devices. The antennae receive RF signals sent from the one or more tracked devices, and the base station uses the received signal timing information of those signals, as received by the antennae, to determine the physical position of each tracked devices. The position of the tracked device can be obtained using one or more of various methods when using RF signals. Such methods include, but are not limited to, time of arrival (TOA), time difference of arrival (TDOA), phase of arrival (POA), angle of arrival (AOA).

Because working volumes can be improved with RF tracking without any dependence on lighting conditions, applications can become more adaptable to their environments and provide a more intuitive interaction with the computer program. These factors may greatly improve VR or AR experience of the user as the user physically navigates her spatial world displayed on her tracked device, such as a tablet or an HMD. Also, using the inherent RF transmitting and coding capabilities of the mobile device, the tracking system can enable more mobile devices to be operable with the tracking system without any hardware changes or additions required for the mobile devices.

After determining the spatial position of the tracked device, the base station provides this position and orientation data to an interactive program that is generating the interactive images displayed on the tracked device or on some other display medium. The position and orientation of the tracked device, either through multiple RF points tracked on the mobile device or through the inertial sensors on or inside the mobile device, are then used to establish a virtual viewpoint (hereafter, "viewpoint") for the view screen of the tracked device or display. The virtual spatial perspective of the viewpoint is then used to view the digital images, related to the viewpoint position and orientation, generated within the interactive software and displayed on the mobile device.

As the user physically moves the mobile device within the working area of the tracking system, the viewpoint changes in relation to the position and orientation of the tracked device. This spatially registered 3D viewpoint, updated in real time, provides the immersive experience of a virtual world within, or in replace of, the actual physical space defined by the tracking system as seen dynamically and in real time by the tracked device of the user, such as a tablet or and HMD. This process can also be described as an emulated virtual camera in an AR or VR space.

By enabling any mobile device with RF transmitting capabilities, a camera or view screen functionality, and inertial sensors to provide VR or AR capabilities with true virtual viewpoint registration, new applications and new levels of immersive interaction become possible. Any mobile device can become a fully capable VR or AR view screen in a digital world that is not only digital but also actually related to the user's physical world. Applications for better virtual visualization in such fields, for example, as retailing, training, gaming, merchandising, and advertising, all become more immersive, engaging, and effective. The combination of RF and inertial tracking to determine the actual position and orientation of the tracked device and registering the position and orientation of the tracked device with the virtual viewpoint held by the user of the digital image displayed on the device view screen adds a more realistic and engaging way to view digital VR or AR images on the tracked device, and this is most enhanced due to the determination of the position of the tracked device within the 3D virtual environment.

In another aspect, a system is provided for immersing a user of a mobile, RF signal-transmitting tracked device in a digital world produced and displayed on a view screen by an interactive software program. The system comprises a network of four or more spatially separated radio frequency (RF) receiver antennae at different locations. Each of the RF receiver antennae receive RF signals transmitted from the tracked device. A base station is in communication with the network of four or more spatially separated RF receiver antennae. The base station includes one or more receiver channels for processing the RF signals acquired by the four or more spatially separated RF receiver antennae and a processor programmed to dynamically compute a position and orientation of the tracked device from information conveyed by the RF signals as the tracked device moves within a physical environment. The base station sends the computed position and orientation of the tracked device to the interactive software program to adjust an image displayed on the view screen in accordance with a virtual viewpoint of the tracked device determined from the computed position and orientation.

In still another aspect, a method is provided for improving virtual reality and augmented reality interactions with a tracked device. The method comprises displaying, on a view screen, a software-generated environment from a three-dimensional virtual viewpoint of the tracked device. Radio frequency (RF) signals transmitted by the tracked device are received on at least four spatially separated receiver antennae. A three-dimensional physical position, based on information conveyed by the RF signals received by the receiver antennae, and an orientation of the tracked device are dynamically computed, as the tracked device moves within a physical environment. The three-dimensional virtual viewpoint of the tracked device is dynamically updated based on the dynamically computed three-dimensional physical position and orientation of the tracked device. The display of the software-generated environment on the view screen is dynamically updated in accordance with the dynamically updated three-dimensional virtual viewpoint of the tracked device.

In still yet another aspect, a method is provided for improving virtual reality or augmented reality interactions with a tracked device. The method comprises dynamically tracking a three-dimensional physical position and orientation of an RF-transmitting tracked device as the tracked device moves within a physical environment using radio-frequency (RF) and inertial sensing signals transmitted by the RF-transmitting tracked device. A virtual viewpoint of the RF-transmitting tracked device, determined from the physical position and orientation of the RF-transmitting tracked device, is registered in an interactive software program. The virtual viewpoint of the RF-transmitting tracked device is spatially registered with respect to a digital image displayed on a display screen by the interactive software program.

Another aspect relates to computer program product for improving virtual reality and augmented reality interactions with a tracked device. The computer program product comprises a computer readable non-transitory storage medium having computer readable program code embodied therewith. The computer readable program code comprises computer readable program code that, if executed, displays on a view screen a software-generated environment from a three-dimensional virtual viewpoint of the tracked device, computer readable program code that, if executed, receives, at four spatially separated receiver antennae, radio-frequency (RF) signals transmitted by the tracked device, computer readable program code that, if executed, dynamically computes a three-dimensional physical position, based on information conveyed by the RF signals received by the receiver antennae, and an orientation of the tracked device as the tracked device moves within a physical environment, computer readable program code that, if executed, updates the three-dimensional virtual viewpoint of the tracked device based on the dynamically computed three-dimensional physical position and orientation of the tracked device, and computer readable program code that, if executed, updates the display of the software-generated environment on the view screen in accordance with the dynamically updated three-dimensional virtual viewpoint of the tracked device.

Still another aspect relates to a mobile device comprising one or more inertial sensors measuring inertial data used to compute an orientation of the mobile device, a radio frequency (RF) signal transmitter transmitting RF signals conveying RF data, an RF signal receiver receiving RF signals conveying three-dimensional physical position about the mobile device computed from the RF data conveyed by the transmitted RF signals, and a processor executing an interactive software program that displays a digital world on a view screen from a three-dimensional viewpoint of the mobile device. The interactive software program dynamically updates the virtual viewpoint of the mobile device based on the three-dimensional physical position and orientation of the mobile device, and dynamically updates the display of the software-generated environment on the view screen in accordance with the dynamically updated virtual viewpoint of the mobile device.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of tracking systems described herein register the three-dimensional position and orientation of a tracked device within an interactive virtual reality (VR) or augmented reality (AR) software program that displays a digital world on a view screen.

In brief overview, the tracking system uses the RF signals transmitted by a tracked device, received at four or more antennae connected to a base station, to calculate the three-dimensional position and orientation of the tracked device. The position and orientation of the tracked device in the real world is then registered within an interactive VR or AR software program and used to establish a virtual camera view or perspective (i.e., virtual viewpoint) within the software program that is creating the virtual world or digital images on the viewscreen. The interactive VR or AR software program then updates the display of the digital world in accordance with this virtual viewpoint. The VR or AR software program may be considered interactive because the view of digital world as displayed by the software program changes dynamically in coordination with movement of the tracked device in the real world, as though the tracked device is moving through that digital world.

By using RF-based position tracking, the tracking system can solve several limitations of camera and other optical tracking systems. These limitations include environmental lighting constraints such as bright sunlight or low light conditions. Camera tracking systems also require line-of-sight to the tracked device, which restricts the freedom of movement and the number of devices working in the tracked working volume. Camera systems are also limited in the size of the area they can track devices as the range between the tracked devices and the cameras is relatively short.

In addition to the lighting and line of sight restrictions of camera systems, markers are typically required to achieve the kinds of accuracies needed for realistic immersive VR or AR applications. Markers can add cost, reduce working volume, and limit freedom of movement, which limits how these camera-based devices are used for VR and AR applications. Also, to produce the high accuracies required by immersive VR and AR programs, camera systems require expensive cameras to perform the position tracking which further limits the reach and effectiveness of these systems in the market.

An RF-based tracking system can provide tracking for mobile devices that is independent of lighting and line-of-sight. Also, the working areas that can be tracked by the RF tracking system can be larger than the areas provided by camera systems. Moreover, the tracking system can also use the inertial sensors of a tracked device to provide an orientation tracking solution, computed either at the tracked device or at the system, with no new hardware required on or within the tracked device (e.g., mobile device, tablet, HMD), thereby, reducing complexity and cost.

Figure 1:
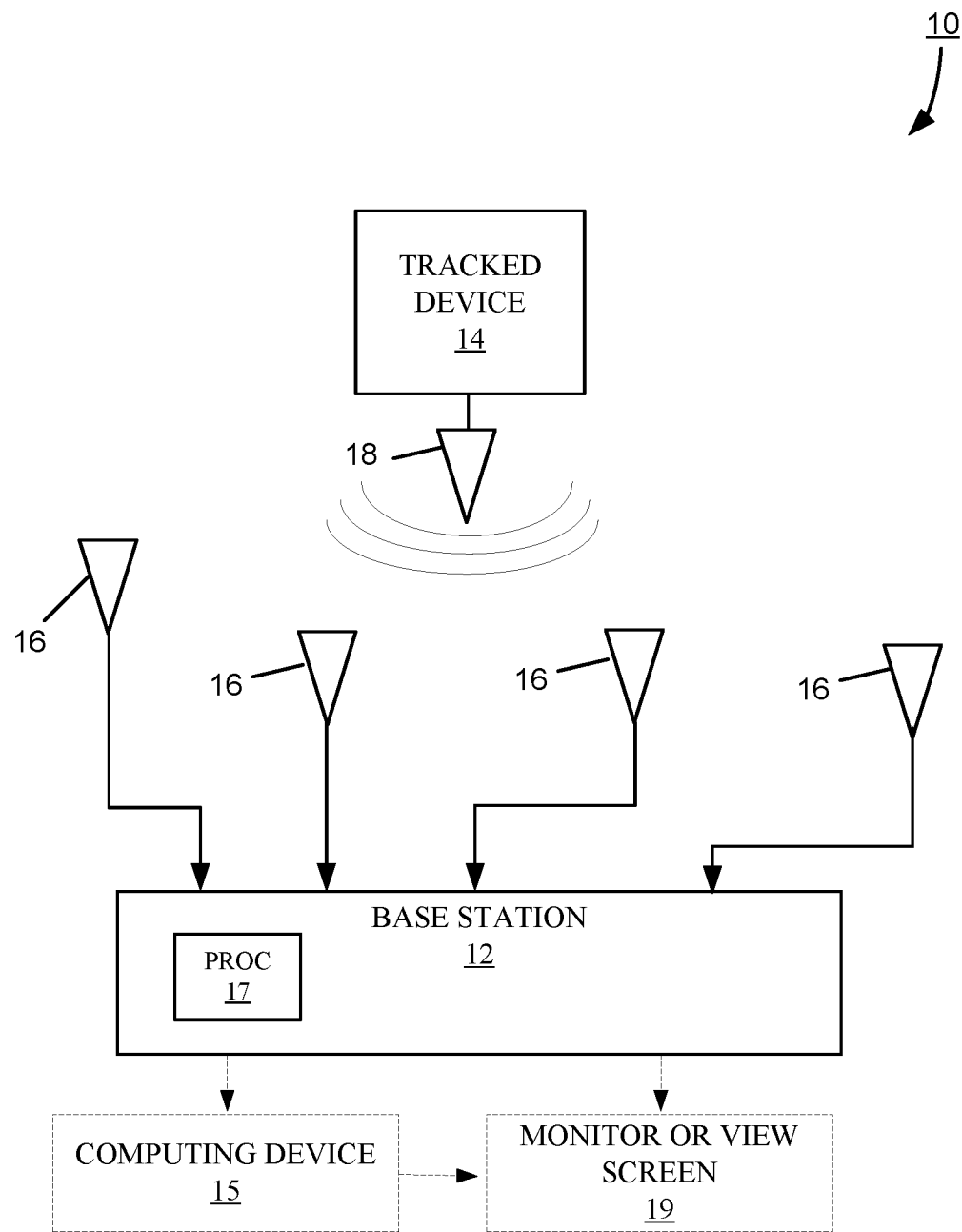
FIG. 1 is a block diagram of an embodiment of a tracking system utilizing a tracked device.

FIG. 1 shows an embodiment of a tracking system 10 including a base station 12 used to track dynamically the physical three-dimensional position of a RF signal-transmitting tracked device 14. The base station 12 is coupled to at least four antennae 16 to receive the RF data and inertial sensor data conveyed by the RF signals sent by the transmitter antenna 18 of the tracked device 14. The coupling between the base station and the antennae 16 may be wireless or wired connections. The base station 12 includes a processor 17 (e.g., DSP, embedded processor, microprocessor, or other processing system) programmed to use the timing information and inertial data in these RF signals to calculate the position and orientation of the tracked device 14.

By incorporating the inertial sensors of the tracked device to provide the orientation of the tracked device, either computed by the tracked device 14 or by the base station 12, the virtual viewpoint can be made more realistic and immersive. The ability of the tracking system to track both position, by utilizing the RF signals sent from a tracked device, and orientation, using the inertial sensors of the tracked device, provides a new perspective for tracked devices to view virtual and augmented digital worlds.

In general, the tracked device 14 is any mobile device with wireless RF signal-transmitting capabilities and a processor (not shown) for handling communications. Optionally, the tracked device 14 can have RF signal-receiving capabilities, inertial sensors, a view screen, memory storing an interactive software program (VR or AR), or any combination thereof.

The tracked device 14 may be a component separate from the mobile device whose position (x, y, z) is to be dynamically determined, the separate component being carried by, attached to, or embedded in the mobile device. In other embodiments, the tracked device 14 and mobile device may share an antennae, processing, housing, inertial sensors, or other components. As a result of such physical coupling, movement of the mobile device produces a corresponding movement of the RF signal-transmitting tracked device; and the three-dimensional position of the RF signal-transmitting device is taken to be the three-dimensional position of the mobile device. Examples of such mobile devices include, but are not limited to, game controllers, TV remote control devices, mobile smart phones, laptop computers, electronic tablets, VR glasses, AR glasses, and HMDs. As used herein, a general mention of a mobile device encompasses any of such examples of mobile device.

The tracked device 14 can have a variety of configurations. Because of the close physical coupling of the tracked device with the mobile device, a change in position or orientation of the mobile device produces a corresponding change in position or orientation of the tracked device. A three-dimensional position or orientation determined for the mobile device may be considered the three-dimensional position or orientation of the tracked device, and, conversely, a three-dimensional position or orientation determined for the tracked device may be considered to as the three-dimensional position or orientation of the mobile device. Accordingly, a general reference to the position and orientation of the tracked device 14 encompasses also the position and orientation of the mobile device to which the tracked device 14 is physically coupled. Further, the terms "tracked device" and "mobile device" may be used interchangeably.

For example, in one example configuration, the separate component (i.e., tracking device) provides both the position and orientation of the mobile device to the interactive software program. This interactive software program uses this position and orientation as those of the mobile device in relation to the virtual or augmented three-dimensional digital world.

Another example configuration uses the RF signal-transmitting capabilities of the mobile device, and the inertial-sensing capabilities of the tracked device to provide the orientation. The tracked device 14 sends the inertial data to the mobile device to be included in the RF signals transmitted by the mobile device.

Still another example configuration uses inertial-sensing capabilities of the mobile device for orientation, and the RF signal-transmitting capabilities of the tracked device to provide positioning. The mobile device sends the inertial data to the tracked device to be included in the RF signals transmitted by the tracked device.

Still yet another example configuration, the RF signal-transmitting capabilities and inertial-sensing capabilities of the mobile device is provide both the RF data and the inertial sensor data for determining position and orientation of the mobile device with respect to the virtual three-dimensional digital world produced by the interactive software program.

The interactive software program that displays the digital world on a view screen can run either on the processor 17 of the base station 12, on the processor of the tracked device 14, or on a processor of another separate computing device 15. In an embodiment where the processor 17 of the base station 12 executes the interactive software program, the base station 12 can be connected to a monitor 19 for displaying the digital world from the virtual viewpoint of the tracked device. The monitor 19 is separate from the tracked device 14. The base station 12 may include a High Definition Multimedia Interface (HDMI), or similar connection, to the monitor 19 for displaying the digital world produced by the interactive software program. The digital world can be shown on the monitor 19 in addition to, or instead of, being shown on the view screen of the tracked device; in each instance, the physical position and orientation of the tracked device affects the virtual viewpoint of the tracked device as shown on the separate monitor 19.

In an embodiment where the processor of the tracked device executes the interactive software program, the base station 12 can transmit the position and orientation to the tracked device 14. The processor of the tracked device 14 registers this position and orientation with the interactive software program to update the display on a view screen (not shown) of the tracked device. In this embodiment, the base station 12 includes RF signal-transmitting capabilities and the tracked device 14 includes RF signal-receiving capabilities.

In an embodiment where the processor of the separate computing device 15 executes the interactive software program, the base station 12 can include an interface (not shown) to transmit the position and orientation to the computing device 15. This interface can be a wired or wireless connection. For a wireless connection, the base station 12 can include RF signal-transmitting capabilities and the computing device can include RF signal-receiving capabilities. The processor of the computing device 15 registers this position and orientation with the interactive software program to update the display on a view screen (e.g., the monitor 19 or its own view screen).

The base station 12 and the optional computing device 15 can store a library of interactive programs, each of which is configured to register the position and orientation computed by the base station and to update the virtual viewpoint of the tracked device within the digital world produced by that interactive program.

Although described herein primarily with respect to a single tracked device 14, the tracking system 10 can track the position and orientation of multiple tracked devices simultaneously, using standard coding techniques to distinguish among the tracked devices. The processor running the interactive software program can register and dynamically update the virtual viewpoint of each tracked device in the digital world produced by the interactive software program.

Figure 2:
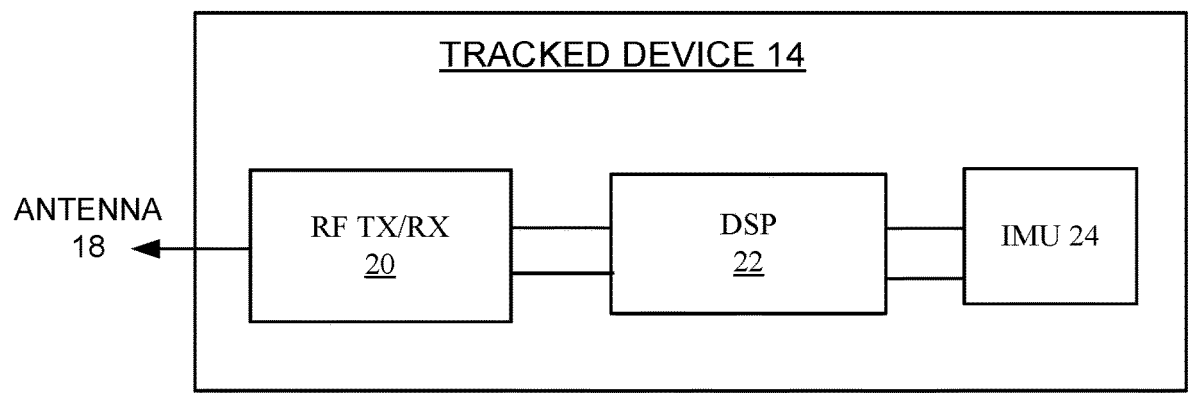
FIG. 2 is a block diagram of an embodiment of the hardware components included in the tracked device for generating and delivering RF signals and inertial data to tracking system.

FIG. 2 shows an embodiment of hardware of the tracked device 14 including the TX/RX antenna 18, transmit and receive circuitry 20, digital signal processing (DSP) hardware 22, and one or more inertial sensors (IMU) 24. The tracked device 14 sends data through the TX/RX antenna 18, which is then received by the at least four antennae 16 in communication with the base station 12.

The DSP hardware 22 is used to communicate with the IMU 24 and modulate the baseband data before sending the data and tracked device identification data to the RF transceiver 20 for transmission to the base station 12 and/or base station antennae 16.

The one or more inertial sensors 24 may be any one or combination of gyroscopes, accelerometers, and magnetic sensors or other devices that provide motion or orientation information. In one embodiment, the RF signals transmitted by the tracked device 14 include inertial data obtained by the one or more inertial sensors 22 for use by the base station 12 to compute the orientation of the tracked device 14. In another embodiment, the DSP 22 can compute the orientation of the tracked device 14 from the inertial data for local use at the tracked device 14 by an interactive software program (VR or AR). For example, the DSP 22 of the tracked device 14 (or other processor, not shown) may be running this interactive software program that uses the computed orientation (along with the tracked position) in the generation of the virtual viewpoint. In this embodiment, the TX/RX antenna 18 receives RF signals (from the base station) with the computed position of the tracked device 14. Alternatively, or additionally, the TX/RX antenna 18 can transmit RF signals with the orientation computed at the tracked device 14 for use by the base station (e.g., in the event the interactive software program is running elsewhere other than at the tracked device 14).

Figure 3:
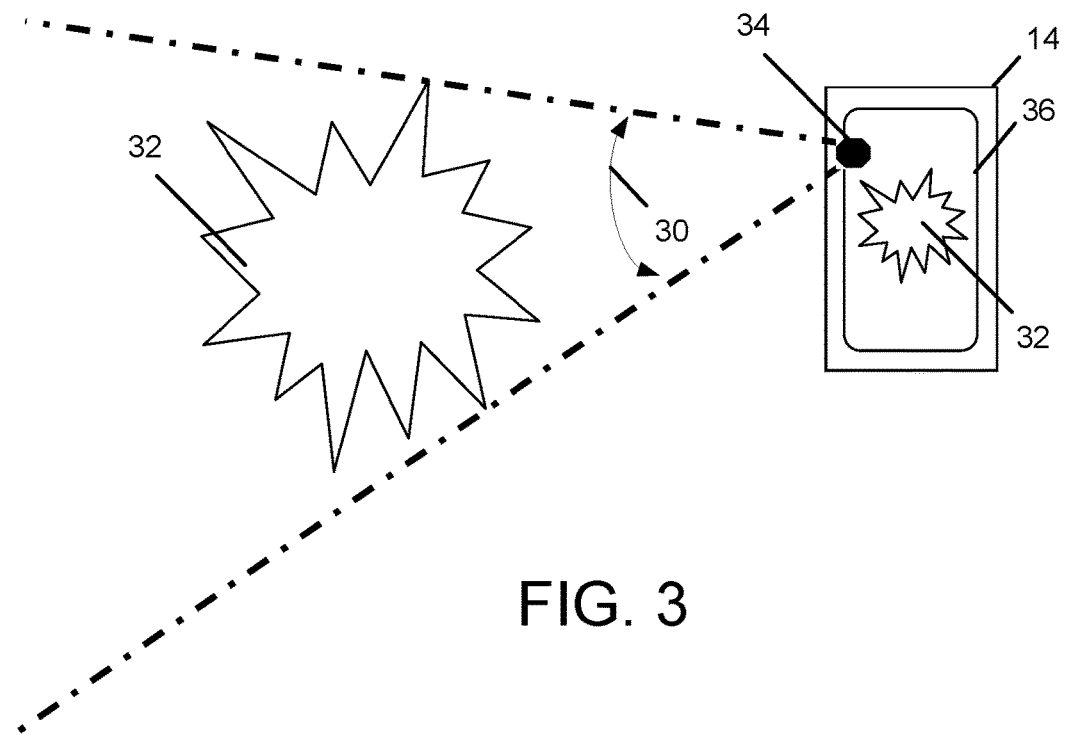
FIG. 3 is an illustration of a spatially adjusted virtual viewpoint of the digital image as generated by and seen on the tracked device.

FIG. 3 shows an example of a virtual viewpoint or virtual camera 30 of the mobile device 14. The mobile device 14 is running a VR or AR application program that produces a virtual or real environment 32, for example, an automobile within a showroom. This environment 32 has its own coordinate system within the VR or AR application program. In a VR application program, the environment 32 is virtual; in an AR application program, a camera mounted in the tracked device 14 provides video of the actual physical environment 32 to the view screen, and the position of the tracked device 14 is used to overlay the augmented virtual world based on viewpoint 30 as tracked. The virtual viewpoint 30 corresponds to the "field of vision" or "view angle" from a particular point 34 (i.e., a virtual camera) on the mobile device 14. The view angle at which the virtual viewpoint 30 of the virtual camera 34 is configured may be based on the camera angle that is used by the tracked device 14, such as the smartphone or tablet.

The VR or AR application program running on the mobile device 14 displays the environment 32 on the view screen 36, as the environment 32 would look in the real three-dimensional world through the view screen 36 of the mobile device 14, based on the virtual viewpoint 30, and dynamically adjusted in real time according to the current real world position of the mobile device 14, as computed by the base station 12, and orientation, as computed by either the mobile device 14 or base station 12. Accordingly, the virtual viewpoint 30 enables an immersive interaction with the VR or AR software by allowing the mobile device 14 to physically move in real space and view a digital image on its view screen 36 as if the mobile device was a window into the virtual or real environment 32 produced and displayed by the software.

Figure 4:
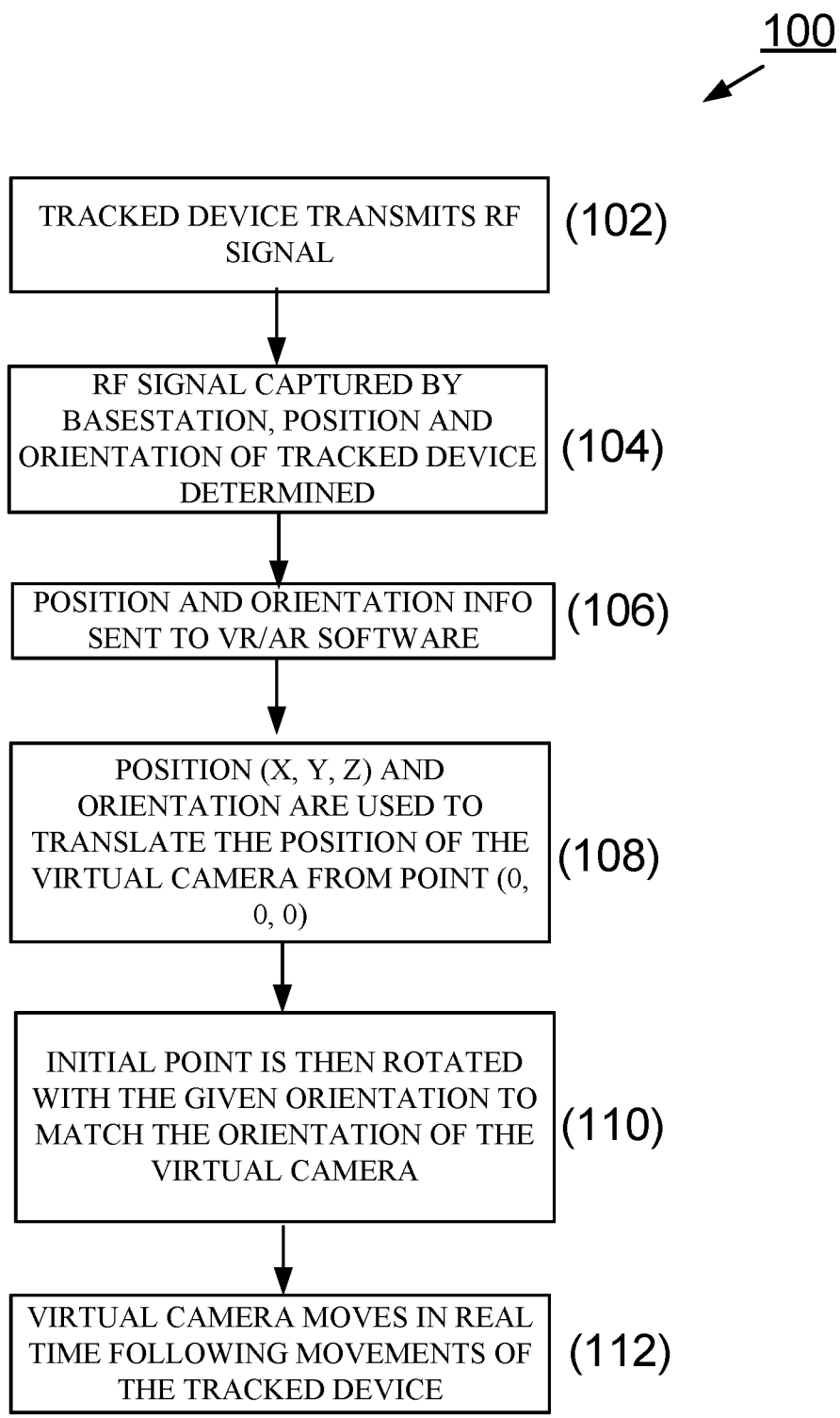
FIG. 4 is a flow chart of an embodiment of a process performed by the tracking system to provide virtual reality or augmented reality for a tracked device.

FIG. 4 shows an embodiment of a process 100 performed by the tracking system 10 to enhance the virtual reality or augmented reality program functionality of the mobile device 14. At step 102, the tracked device 14 transmits an RF signal, which includes RF data and inertial sensing data. The at least four antenna 16 receive and amplify the RF signal and pass the amplified RF signal to the base station 12. From the amplified RF signals received from the antenna 16, the base station 12 determines (step 104) the position and orientation of the tracked device 14. Examples of a system and method for calculating the three-dimensional position of a tracked device are described in U.S. Pat. No. 8,749,433 B2, issued Jun. 10, 2014, and titled "Multiplexing Receiver System," the entirety of which patent is incorporated by reference herein. In addition, examples of a system and method for using inertial sensors to provide the orientation of a tracked device are described in U.S. application Ser. No. 13/293,639, filed Nov. 10, 2011, and titled "Position Tracking System and Method Using Radio Signals and Inertial Sensing," the entirety of which patent application is incorporated by reference herein.

The base station 12 transmits (step 106) the position and orientation information to the mobile device 14, to be registered by a virtual reality or augmented reality software running on the mobile device. Examples of a system and method for registering the position of a tracked device within a software program are described in U.S. application Ser. No. 13/918,295, filed Jun. 14, 2013, and titled "RF Tracking with Active Sensory Feedback," the entirety of which patent application is incorporated by reference herein.

The software converts (step 108) the absolute position units to the coordinate system units of the virtual digital environment. The software then uses this converted position (x, y, z) to translate the position of the virtual camera 34 from the initial point of origin in the coordinate system (point 0, 0, 0). This reference point (i.e., point of origin) is chosen as the position of one of the four or more antennae 16 that are used by the tracking system 10. The initial point is rotated (step 110) with the given orientation to match the orientation of the viewpoint of the virtual camera. Because of the rotation, the position and orientation of the virtual camera in the digital VR or AR scene accurately mimics the position of the tracked device in real world in relation to the point of origin in the tracking system. The virtual camera moves (step 112) in real time following the movements of the tracked device 14.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles of this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A mobile device, comprising:
   one or more inertial sensors configured to measure inertial data that are used to compute an orientation of the mobile device;
   a radio frequency (RF) signal transmitter configured to transmit RF signals conveying RF data;
   an RF signal receiver configured to receive RF signals conveying a three-dimensional (3D) physical position of the mobile device that is determined from the RF data conveyed by the RF signals transmitted by the RF signal transmitter; and
   a processor configured to execute an interactive software program that displays a digital world on a view screen from a 3D virtual viewpoint of the mobile device, the interactive software program dynamically updating the 3D virtual viewpoint of the mobile device based on the three-dimensional physical position of the mobile device conveyed by the RF signals received by the RF signal receiver and on the orientation of the mobile device computed from the inertial data measured by the one or more inertial sensors, the interactive software program dynamically updating the display of the digital world on the view screen in accordance with the dynamically updated 3D virtual viewpoint of the mobile device.

2. The mobile device of claim 1, wherein the processor is configured to compute the orientation of the mobile device based on the inertial data measured by the one or more inertial sensors.

3. The mobile device of claim 1, wherein the RF signals transmitted by the RF signal transmitter include the inertial data measured by the one or more inertial sensors, and wherein the RF signals received by the RF signal receiver include the orientation of the mobile device computed from the transmitted inertial data.

4. The mobile device of claim 1, further comprising a tracked device physically coupled to the mobile device, the tracked device comprising the RF signal transmitter.

5. The mobile device of claim 1, further comprising a tracked device physically coupled to the mobile device, the tracked device comprising the RF signal receiver.

6. The mobile device of claim 1, further comprising a tracked device physically coupled to the mobile device, the tracked device comprising the one or more inertial sensors that are configured to measure inertial data.

7. The mobile device of claim 1, further comprising a tracked device physically coupled to the mobile device, the tracked device comprising the processor.

8. The mobile device of claim 1, wherein the mobile device further comprises the view screen.

9. A method of improving virtual reality or augmented reality interactions with a mobile device, the method comprising the steps of:
   measuring, by one or more inertial sensors of the mobile device, inertial data used to compute an orientation of the mobile device;
   transmitting, by the mobile device, radio frequency (RF) signals conveying RF data;
   receiving, by the mobile device, RF signals conveying a three-dimensional (3D) physical position of the mobile device determined from the RF data conveyed by the RF signals transmitted by the mobile device;
   displaying, by an interactive software program executing on the mobile device, a digital world on a view screen from a 3D virtual viewpoint of the mobile device;
   dynamically updating, by the interactive software program, the 3D virtual viewpoint of the mobile device based on the three-dimensional physical position of the mobile device conveyed by the RF signals received by the mobile device and on the orientation of the mobile device computed from the inertial data measured by the one or more inertial sensors of the mobile device; and dynamically updating, by the interactive software program, the display of the digital world on the view screen in accordance with the dynamically updated 3D virtual viewpoint of the mobile device.

10. The method of claim 9, further comprising the step of computing, by the mobile device, the orientation of the mobile device based on the inertial data measured by the one or more inertial sensors of the mobile device.

11. The method of claim 9, wherein the RF signals transmitted by the mobile device include the inertial data measured by the one or more inertial sensors of the mobile device, and wherein the RF signals received by the mobile device include the orientation of the mobile device computed from the transmitted inertial data.

12. The method of claim 9, wherein the mobile device comprises a tracked device physically coupled thereto, and the tracked device transmits the RF signals conveying the RF data.

13. The method of claim 9, wherein the mobile device comprises a tracked device physically coupled thereto, and the tracked device receives the RF signals that convey the three-dimensional (3D) physical position of the mobile device.

14. The method of claim 9, wherein the mobile device comprises a tracked device physically coupled thereto, and the tracked device executes the interactive software program.

15. The method of claim 9, wherein the mobile device comprises a tracked device physically coupled thereto, and the tracked device measures the inertial data.

16. The method of claim 9, wherein the mobile device comprises the view screen.

* * * * *